United States Patent [19]
Yeckley

[11] Patent Number: 5,545,597
[45] Date of Patent: Aug. 13, 1996

[54] SILICON NITRIDE CERAMIC HAVING HIGH FATIGUE LIFE AND HIGH TOUGHNESS

[75] Inventor: Russell L. Yeckley, Oakham, Mass.

[73] Assignee: Saint-Gobain/Norton Industrial Ceramics Corp., Worcester, Mass.

[21] Appl. No.: 402,086

[22] Filed: Mar. 10, 1995

Related U.S. Application Data

[62] Division of Ser. No. 136,691, Oct. 14, 1993.

[51] Int. Cl.[6] ............................................. C04B 35/58
[52] U.S. Cl. ........................... 501/98; 501/97; 501/152
[58] Field of Search ............................ 501/97, 98, 152

[56] References Cited

U.S. PATENT DOCUMENTS

| | | | |
|---|---|---|---|
| 4,102,698 | 7/1978 | Lange et al. | 501/98 |
| 4,446,100 | 5/1984 | Adlerborn et al. | 264/56 |
| 4,609,633 | 9/1986 | Fukuhara et al. | 501/98 |
| 4,904,624 | 2/1990 | Yeckley | 501/97 |
| 4,920,085 | 4/1990 | Yoshida et al. | 501/98 |
| 5,002,907 | 3/1991 | Hayakawa et al. | 501/98 |
| 5,032,554 | 7/1991 | Mizuno et al. | 501/98 |
| 5,059,565 | 10/1991 | Peuckert et al. | 501/98 |
| 5,114,889 | 5/1992 | Osamura et al. | 501/98 |
| 5,188,781 | 2/1993 | Peuckert | 501/98 |

FOREIGN PATENT DOCUMENTS

| | | |
|---|---|---|
| 3141590 | 6/1982 | Germany . |
| 5771872 | 9/1986 | Japan . |

*Primary Examiner*—Deborah Jones
*Attorney, Agent, or Firm*—Thomas M. DiMauro

[57] ABSTRACT

A sintered silicon nitride ceramic comprising between about 0.6 mol % and about 3.2 mol % rare earth as rare earth oxide, and between about 85 w/o and about 95 w/o beta silicon nitride grains, wherein at least about 20% of the beta silicon nitride grains have a thickness of greater than about 1 micron.

18 Claims, 6 Drawing Sheets

SILICON NITRIDE CERAMIC HAVING HIGH FATIGUE LIFE AND HIGH TOUGHNESS

STATEMENT OF GOVERNMENT SUPPORT

This invention was developed with support from the U.S. government under DOE Contract No. DE-AC05-840R21400 and DOD Contract No. DAAL-91-C-0039.

This is divisional of copending application Ser. No. 08/136,691 filed on Oct. 14, 1993.

BACKGROUND OF THE INVENTION

Ceramic materials are currently viewed as potential substitutes for steel and other metals due to their superior strength at high temperatures, thermal shock resistance, toughness, hardness and chemical oxidation resistance. One particular ceramic, silicon nitride, has been identified for use in high temperature applications such as gas turbines and diesel engines.

Two critical parameters of any silicon nitride ceramic are its high temperature strength and its toughness. Typically, high temperature strength is inversely related to the amount of sintering aid used, while toughness is directly related to the presence of grains having a high aspect ratio, i.e., beta phase grains whose lengths are at least four times their thickness.

Processing raw materials into a useful ceramic body commonly requires a number of engineering operations. A typical process entails preparing a silicon nitride powder or a precursor thereof, forming a definitively-shaped compact or "green body" from the powder, and sintering the green body to produce a densified hard, tough ceramic. In the sintering process, the green body is subjected to high temperatures (about 1800°–2000° C.) which facilitate material transport. This transport reduces the pore size and volume between the green body particles and assists in the bonding of adjacent particles, thus producing a strong, dense ceramic. Ceramics used in high temperature applications often require advanced sintering processes, such as gas pressure or pressure-assisted sintering ("GPS") or glass encapsulated hot isostatic pressing ("hipping" or "HIP" or "HIPping"), which subject the green body not only to high temperatures but also to pressures on the order of 30,000 psi.

It has been found that GPS processes are typically conducive to growing grains having a high aspect ratio. During GPS, silicon nitride normally transforms completely from the alpha to the beta phase in the intermediate stages of sintering, during which time beta grain growth and pore elimination occur. Moreover, GPS cycles are typically run at temperatures greater than 1850 degrees C., thus favoring grain growth of large beta nuclei. Accordingly, GPS ceramics typically possess high toughness. However, because a GPS ceramic typically requires at least about 10 weight percent ("w/o") of sintering aids, its high temperature properties are usually mediocre.

In contrast, when a silicon nitride green body containing less than 5 w/o sintering aid is HIPped at about 1825 degrees C., it densifies to greater than 90% of theoretical density in as little as 15 minutes. Although the lower level of sintering aids in such hipped ceramics leads to superior high temperature properties, little grain growth occurs and microstructural development takes place only in the latter stages of densification. Since there is little opportunity for the formation of large beta nuclei, HIPped silicon nitrides do not possess the high aspect ratio grains required for high toughness.

Previous attempts to grow high aspect ratio grains in hipped silicon nitride included seeding the silicon nitride powder with beta grains and raising the HIPping temperature to at least 2000 degrees C. However, seeding was found to lower the average fracture toughness while the high temperature hipping modification increased the rate of silicon nitride sublimation, thus yielding ceramics having unacceptable levels of porosity.

Accordingly, it is the object of the present invention to provide a silicon nitride ceramic having low levels of sintering aids and a high toughness.

SUMMARY OF THE INVENTION

In accordance with the present invention, there is provided a sintered silicon nitride ceramic comprising between about 0.6 mol % and about 3.2 mol % rare earth as rare earth oxide, and between about 85 w/o and about 95 w/o beta silicon nitride grains, wherein at least about 20 w/o of the beta silicon nitride grains have a thickness of greater than about 1 micron.

DETAILED DESCRIPTION OF THE INVENTION

Figure 1:
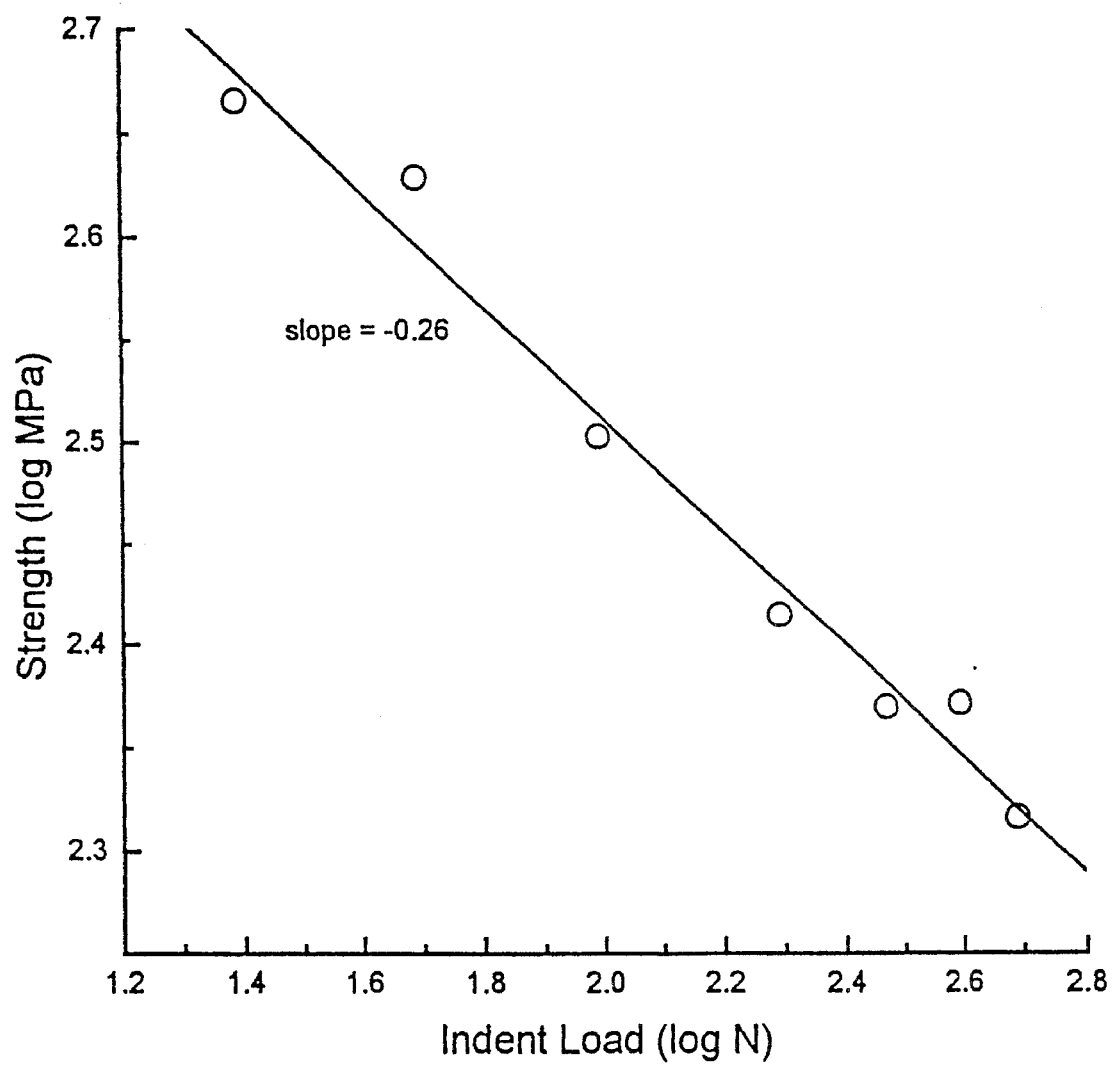
FIG. 1 is a graph showing the effect of indentation load on the strength of Example D of the present invention.

It has been unexpectedly found that the toughness of hipped silicon nitrides can be increased by either (a) subjecting the hipped ceramic to a post-hip heat treatment, or (b) presintering the green body at a temperature of at least about 2000 degrees C. Without wishing to be tied to a theory, it is believed that the presintering thermal treatment enables the formation of large beta nuclei which then grow during hipping to become modest aspect ratio coarse grains, often with diameters of more than one micron. Similarly, the post-HIP heat treatment provides energy for the coarsening of thin, high aspect ratio beta grains formed during HIPping. It is believed the coarse grains produced by these thermal treatments provide enhanced toughness through crack bridging.

The silicon nitride starting material of the present invention may be any silicon nitride powder or precursor thereof. In preferred embodiments, alpha silicon nitride powder is used as the starting material and comprises between about 95 w/o and about 99 w/o by weight of the final ceramic body. More preferably, the silicon nitride powder is at least about 80 w/o alpha phase, has a surface area of between about 5 and about 20 m$^2$/g, a silica content of between about 1.5 w/o and about 3.0 w/o, and an iron content of less than about 100 ppm. Most preferably, the silicon nitride starting material is a mixture of Ube E03, Ube E05 and Ube E10, each available from Ube Industries, New York, N.Y.

The present invention comprises at least one rare earth sintering aid to assist the densification of the silicon nitride. Typically, the rare earth comprises between about 0.6 mol % and about 3.2 mol %, preferably between about 1.2 mol % and about 2.4 mol %, as rare earth oxide of the sintered ceramic. In some embodiments, this rare earth sintering aid is selected from the group consisting of yttria, samaria and ytterbia, and preferably comprises about 2.4 mol % of the ceramic as rare earth oxide. In more preferred embodiments, the present invention comprises two sintering aids selected from the group consisting of samaria, neodymia and erbia. In some binary embodiments, each rare earth typically comprises at least about 0.3 mol % of the ceramic as rare earth oxide and between about 30 w/o and about 70 w/o of the total rare earth component.

In some embodiments of the present invention, silica can be added to the mixes of silicon nitride and rare earth starting materials. Adding between about 1 w/o and about 3 w/o silica provides a rare earth-to-silica ratio conducive to formation of the rare earth disilicate grain boundary phase.

The silicon nitride starting material and sintering aids can be processed into green bodies in any conventional manner. Methods used in mixing the powder and aids ("the mixes") of the present invention include, but are not limited to, ball milling and attrition milling. In some embodiments, the mixes are milled in water. In other embodiments, the mixes are milled in isopropyl alcohol for 36 hours and subsequently dried. The preferred milling media is either polyurethane or nylon-coated steel balls.

If the mixes have a high surface area, they may be spray dried to create a flowable powder.

The mixes may be filtered for impurities at any stage of the process. Typically, filter is undertaken after the milling step and is usually carried out with a 20 micron filter.

Temporary binders used to assist in green body formation include, but are not limited to, polyethylene glycol and PVA.

Green body forming methods include die pressing, rubber mold pressing, extrusion molding, slip casting, and injection molding. In some embodiments, the mixes are cold pressed into tiles and then cold isostatically pressed at 30 ksi.

If an organic binder is used to assist green body formation, the green body may be air fired at about 600 degrees C. to remove the binder.

In some embodiments, the green body is presintered at a temperature of between about 1750 degrees C. and about 2000 degrees C. in about 0.14–105 MPa nitrogen for about 30 to 180 minutes. This presintering step accelerates the formation of large beta nuclei which then grow during hipping to become grains of modest aspect ratio, often with thicknesses of more than one micron. After a green body is presintered, its density is typically between about 1.6 g/cc and about 2.5 g/cc.

If the green body is presintered as above, it is typically subjected to a HIPping step in accordance with U.S. Pat. No. 4,446,100. Typically, the HIPping includes a soak at a temperature of between about 1800 and about 1900 degrees C. for about 60 minutes. During the HIPping step, the large beta nuclei produced by the presinter step grow rapidly at the expense of the smaller grains surrounding them. After HIPping, the sintered ceramic typically has a density in excess of about 99.5% of theoretical density.

In other embodiments of the present invention, the green body is subjected to HIPping in accordance with U.S. Pat. No. 4,446,100 and to a subsequent heat treatment in nitrogen. The post hip heat treatment coarsens the microstructure of the HIPped ceramic. Typically, the post-HIP heat treatment is undertaken at a temperature of between about 1800 and about 2000 degrees C. in a 50–250 MPa nitrogen atmosphere for between about 2 and about 4 hours. More preferably, this treatment can be undertaken at about 1840 degrees C. in a 200 MPa nitrogen atmosphere for about 4 hours. The post-hipping heat treatment may optionally be undertaken in a powder bed of silicon nitride.

It is also contemplated that the results of the post-HIP heat treatment can also be realized by merely extending the length of the soak in the HIP operation. For example, it is contemplated that extending the conventional hipping operation to about 4 hours may achieve similar properties.

The microstructure of the ceramics of the present invention typically reveals beta grains comprising at least about 85–95 w/o of the ceramic. Typically, the mean thickness of the beta grains is between about 0.3 and about 1.0 micron, and the mean aspect ratio is between about 6 and about 10.

In most preferred embodiments, the sintered ceramics described above typically have a flexural strength of at least about 350 MPa at 1371 degrees C., a compressive creep rate of less than about $10^{-6}$/sec at 1371 degrees C. and 200 MPa, and a toughness which increases to about 9–11 MPa $m^{1/2}$ within the first 600 to 800 microns of the crack. The latter characteristic is termed R-curve behavior.

EXAMPLES A–G

The first seven examples examined the effect of subjecting the hipped ceramic to a post-hip heat treatment on toughness. A combination of Ube E03 and E10 silicon nitride powder was used as the silicon nitride starting material. The average particle size of the combination was less than about 1.5 microns, with 90% being finer than 3.0 microns; its oxygen content examination was about 1.0 w/o; its iron content was about 100 parts per million (ppm); its boron content was about 50 ppm; and its BET surface area was between about 8 and 9 $m^2/g$.

This silicon nitride starting material was mixed with rare earth oxides so that the total rare earth oxide content was 0.0177 moles per 100 grams of powder (i.e., about 2.4 mol% of the hipped ceramic). The rare earth oxides used in these Examples were as follows:

| Example | Rare Earth #1 (w/o) | | Rare Earth #2(w/o) | |
|---|---|---|---|---|
| A | erbia | 3.44 | yttria | 1.97 |
| B | yttria | 2.00 | neodymia | 2.98 |
| C | samaria | 3.08 | erbia | 3.44 |
| D | samaria | 3.08 | erbia | 3.44 |
| E | neodymia | 2.98 | ytterbia | 3.49 |
| F | yttria | 4.00 | | |
| G | yttria | 4.00 | | |

In Examples, A and C, 2.13 w/o of silica was also added. This mix was then ball milled in water. The milled product had a solids content of between about 50–65 %, a surface area of between about 8 and 11 $m^2/g$, and a mean particle size of about 0.9 microns. The milled slip was then filtered through a 20 micron filter. A binder comprising about 3% Carbowax 8000, available from Union Carbide of Danbury, Conn. and 0.5% PVA was then blended into the slip and the slip was spray dried. The spray-dried powder was diepressed at 5000–10000 pounds into a three inch by three inch tile. The pressed tile was then isopressed to 30 ksi. The binder was burned out in air at 600 degrees C. The tile was then hipped at 1840 degrees C. for 60 minutes. Post-hip heat treatment was then carried out as follows:

| Example | post-hip soak temp | time (hr) |
|---------|--------------------|-----------|
| A | 2000 C. | 2 |
| B | 2000 C. | 2 |
| C | 1840 C. | 5 |
| D | 1840 C. | 3 |
| E | 1840 C. | 5 |
| F | 1840 C. | 5 |
| G | 1840 C. | 3.3 |

Toughness was determined by the indentation fracture method, as described in Krause, "Rising Fracture Toughness From the Bending Strength of Indented Alumina Beams", J. Am. Cer. Soc. 71(5) 338–43 (1988). The indent load range between about 2.5 and about 50 kg. Flexure strength testing of the ceramics of the present invention was undertaken on 4 point quarter point fixtures with an outer span of 40 mm. The flexure bar size was either 3 mm by 4 mm by 50 mm or 3 mm by 4 mm by 25 mm.

The effect of load on the strength of Example D of the present invention is presented in FIG. 1. The slope of the strength/load curve for Example A-G is presented below:

| Example | Slope |
|---------|-------|
| A | −0.30 |
| B | −0.31 |
| C | −0.25 |
| D | −0.26 |
| E | −0.27 |
| F | −0.26 |
| G | −0.31 |

Figure 2:
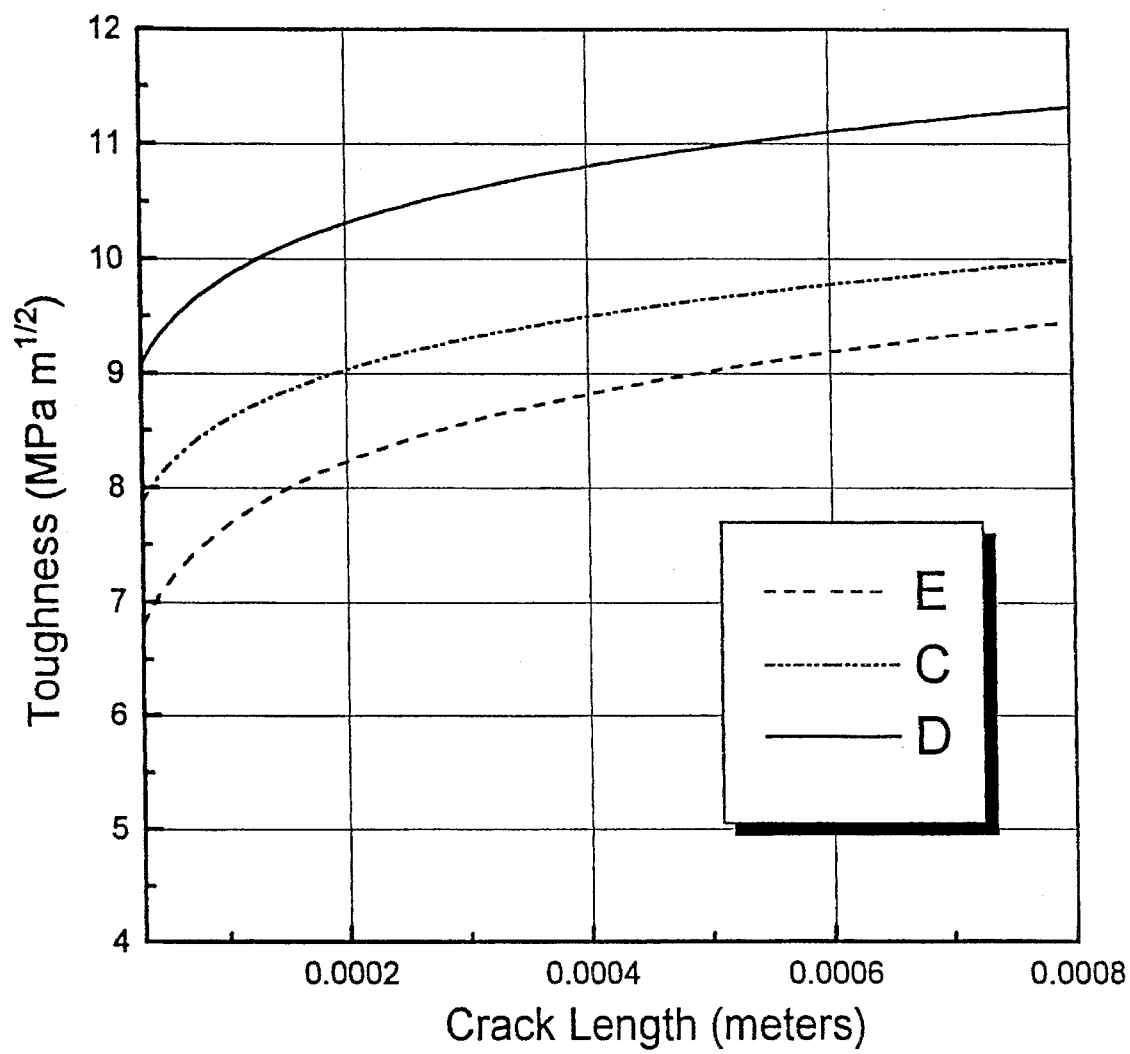
FIG. 2 demonstrates how the toughnesses of Examples C, D and E of the present invention approach 10, 11 and 9 MPa m^½, respectively, at crack lengths of less than 800 microns.

If the slope of the strength versus load curve is less than about −0.33, the ceramic exhibits R-curve behavior,i.e., the toughness of the ceramic increases with crack length. Because each ceramic post-HIPped at 1840° C. has a slope of less than about −0.33, each has R-curve behavior. The toughness at a crack length of about 800 microns for Examples C, E–G was at least about 9 MPa m$^{1/2}$, while the toughness at a crack length of about 800 microns for Example D was 11 MPa m$^{1/2}$. The R-curves for Examples C, D and E are shown in FIG. 2.

Figure 3:
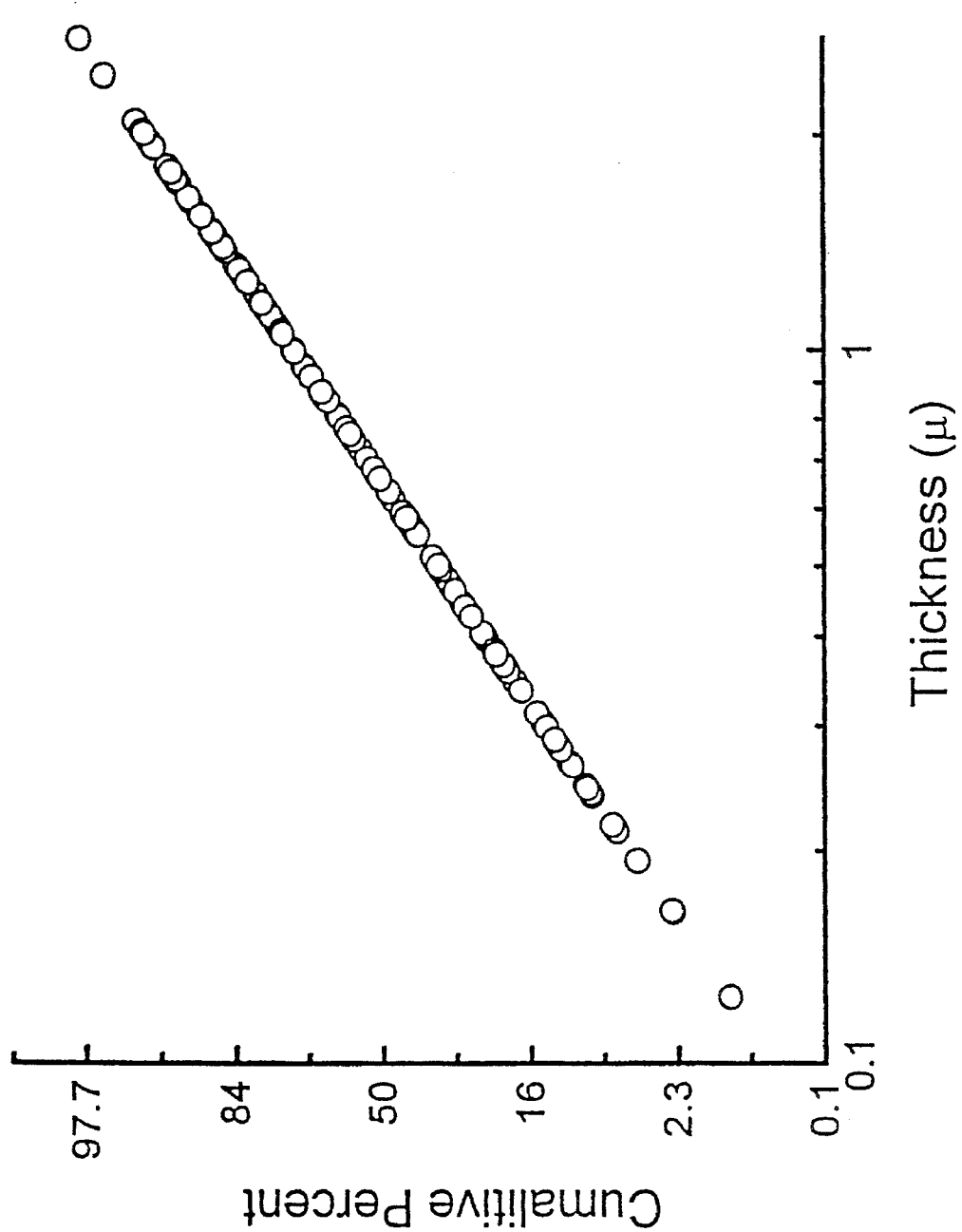
FIG. 3 presents the grain size distribution of Example D of the present invention.
Figure 4:
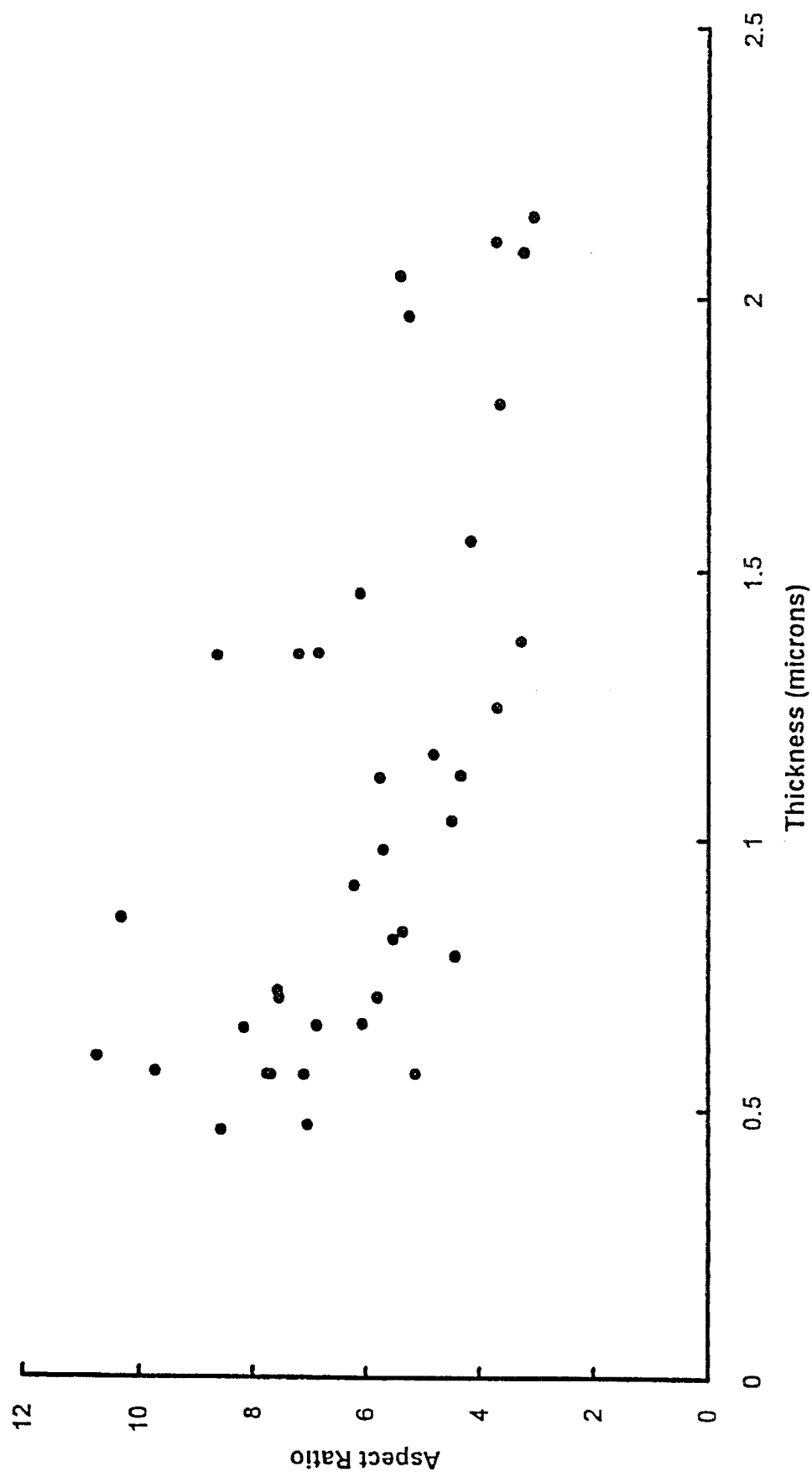
FIG. 4 presents the correlation between aspect ratio and thickness for Example D of the present invention.

Microstructural analysis of Example D was undertaken. This was done by polishing and then etching the samples in molten KOH. Micrographs were taken at 2500X and 5000X. The 5000X photos were used to estimate the grain thickness. Four to six lines were drawn across the micrographs. The shortest dimension of any hexagonal or rectangular shaped grains intercepted by the lines were measured. See FIG. 3, in which the grain distribution of Example D is presented. It is observed that at least about 20% of the grains of Example D have a thickness of at least about 1 micron. The correlation between aspect ratio and grain thickness was examined in Example D. Aspect ratios were determined by drawing four lines across a 2500x micrograph of Example D and recording the thickness and length of each rectangular grain which touched a line. The resulting dependence of aspect ratio on grain thickness for Example D is presented in FIG. 4. FIG. 4 reveals that about 50% of these grains have a thickness of more than 1 micron and those grains have rather modest aspect ratios (i.e., between about 4 and about 7). At least about 45% of the beta silicon nitride grains have an aspect ratio of at least 6. In conventional HIPped silicon nitride ceramics, over 90% of the grains have a thickness of less than 1 micron.

Examples H and I

The following two Examples examined the effect of presintering on toughness. The rare earth content of Examples H and I were as follows:

| Example | Rare Earth #1 (w/o) | | Rare Earth #2(w/o) | |
|---------|----------|------|----------|------|
| H | samaria | 3.09 | ytterbia | 3.49 |
| I | samaria | 3.08 | erbia | 3.44 |

The processing of Examples H and I were carried out exactly as described above except that each green body was subjected to a presinter at 2000 degrees C. at 1500 psi nitrogen for 30 minutes and there was no post-hip treatment.

Strength and toughness measurements were carried out exactly as in Examples A–G above. The slope of the strength/load curve for Examples H and I were −0.27 and −0.28, respectively, thus indicating R-curve behavior. The toughness at a crack length of about 800 microns for Examples H and I was about 8 MPa m$^{1/2}$.

Alternative methods of increasing the toughness of HIPped silicon nitrides have also been discovered. It has been observed that binary rare earth sintering systems yield a finer grain diameter and a higher aspect ratio microstructure than single rare earth systems. It is believed these qualities increase the toughness of the ceramics through crack deflection mechanisms, whether or not the ceramic is subjected to presinter or post-HIP thermal treatments. Examples of this phenomenon are set out below:

EXAMPLES J–T

Examples J–T were processed identically to Examples A–I, except that there was neither a presinter nor post-hip heat treatment step, and the rare earth contents were as follows:

| Example | Rare Earth #1 (w/O) | | Rare Earth #2 (w/o) | |
|---------|----------|------|----------|------|
| J | erbia | 3.44 | yttria | 1.97 |
| K | erbia | 4.00 | yttria | 1.64 |
| L | lanthia | 2.31 | ytterbia | 4.19 |
| M | lanthia | 2.02 | yttria | 2.60 |
| N | neodymia | 2.98 | ytterbia | 3.49 |
| O | yttria | 2.00 | neodymia | 2.98 |
| P | samaria | 3.09 | ytterbia | 3.49 |
| Q | samaria | 3.09 | ytterbia | 3.49 |
| R | samaria | 3.08 | erbia | 3.44 |
| S | samaria | 3.08 | erbia | 3.44 |
| T | neodymia | 2.98 | ytterbia | 3.49 |

Each of the above Examples was selected so that the grain boundary phase would contain two rare earth disilicate phases at equilibrium. In addition, two single rare earth systems, Examples CA and CB, were processed identically to Examples J–T, in order to study the effect of the binary systems on grain size and toughness. Their compositions were as follows:

| Example | Rare Earth #1 (w/o) | | Rare Earth #2(w/o) |
|---------|----------|------|------|
| CA | yttria | 4.00 | none |
| CB | samaria | 6.17 | none |

Toughness of the Examples J–T was also examined as per the method chosen for Examples A–I. The toughnesses, which were found to be independent of crack length, are presented below:

| Example | Toughness (MPa m½) |
| --- | --- |
| J | 6.01 |
| K | 5.71 |
| L | 6.23 |
| M | 5.78 |
| N | 5.87 |
| O | 6.25 |
| P | 6.26 |
| Q | 6.57 |
| R | not tested |
| S | not tested |
| T | not tested |
| CA | 5.46 |
| CB | 3.71 |

The selected binary rare earth sintering systems provide higher toughness than single rare earth sintering aid systems. One particular combination of the binary rare earth sintering aid systems provides a higher level of toughness than the other binary rare earth systems. In particular, the samaria/ytterbia system (Example Q) produces a toughness of at least about 6.5 MPa m$^{1/2}$ in sintered silicon nitride ceramics while the other binary systems examined provide no more than about 6.26 MPa m$^{1/2}$. Although, this phenomenon has only been examined in embodiments having a standard hipping cycle (i.e., no presinter nor post-HIP heat treatment), it is believed that the samaria/ytterbia system would produce a similarly superior toughness in embodiments containing either the presinter or post-hip heat treatments.

Figure 5:
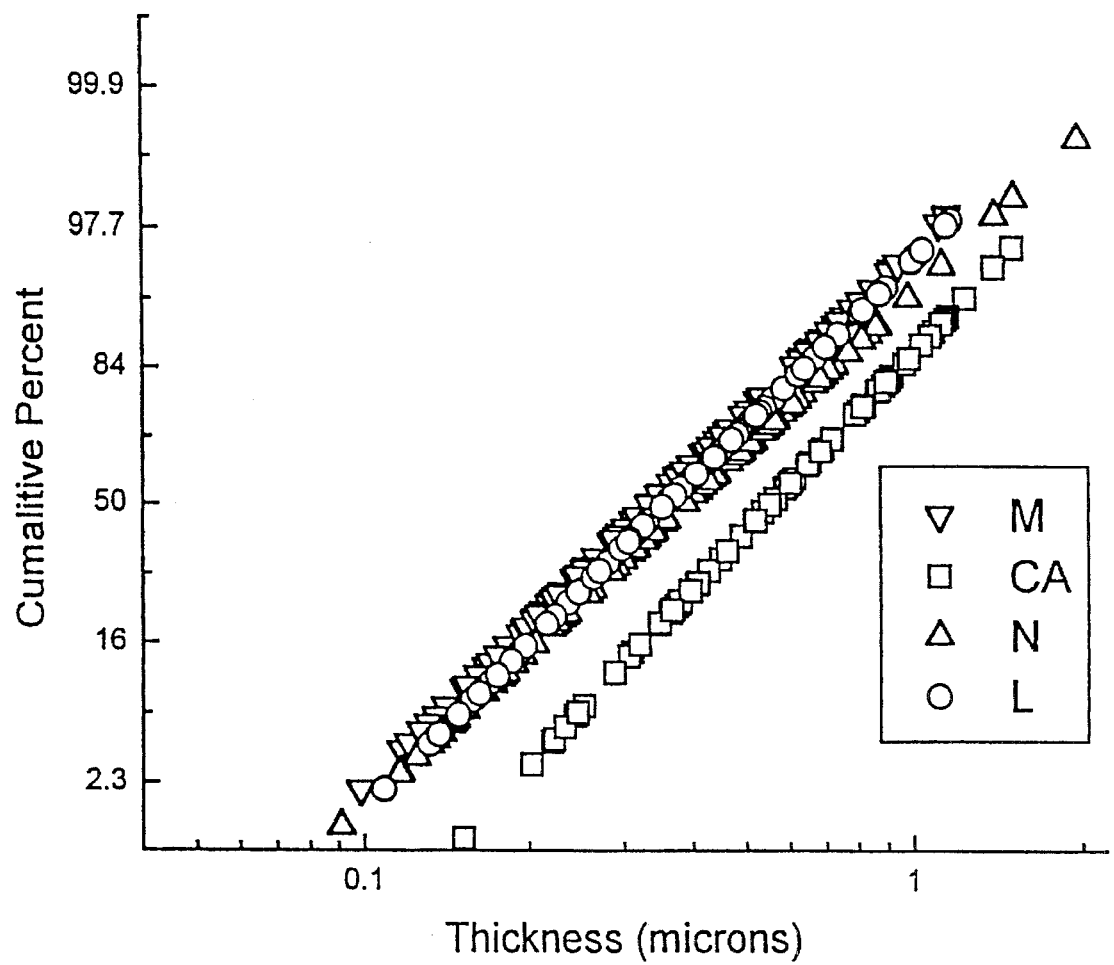
FIG. 5 presents the grain size distribution for three binary rare earth embodiments of the present invention (Examples L, M & N) along with that of Comparative Example CA.

Microstructural analysis of Example Nos. J–T was undertaken as above. FIG. 5 presents the distribution of grain thicknesses for three of the binary rare earth systems (Examples L, M and N) along with a Comparative Example CA. Whereas the ceramics having a binary system have a median grain thickness of about 0.3 microns, the single rare earth system has a median grain thickness of about 0.6 microns.

Figure 6:
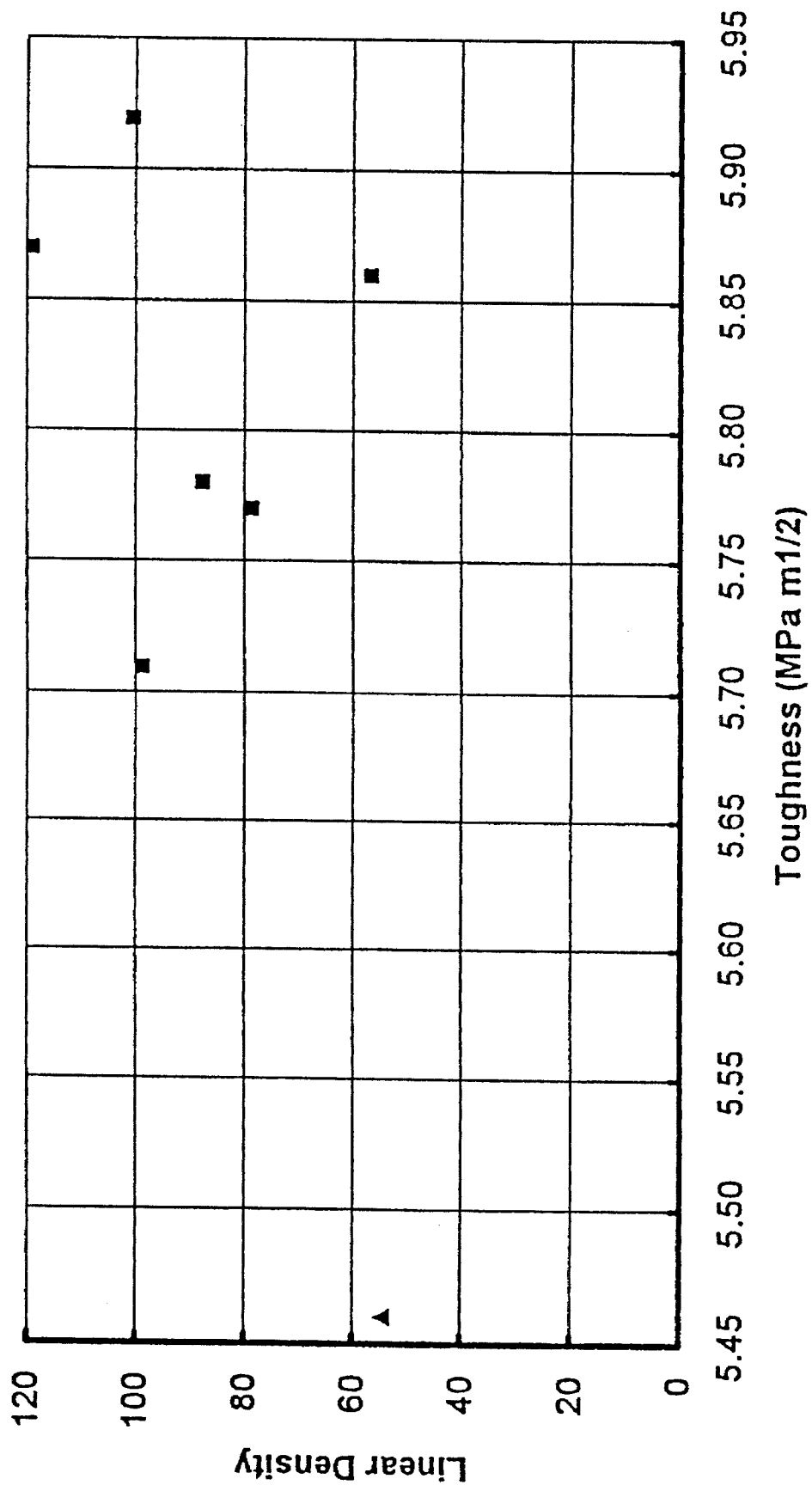
FIG. 6 presents the correlation between high aspect ratio grain frequency ("linear density") and toughness for high toughness binary rare earth embodiments of the present invention (squares) and a single rare earth (triangle).

The aspect ratio of the grains was estimated from 2500X micrographs. Four lines were drawn across the micrographs. The thickness and length were recorded for each rectangular grain touching a line. This result is an estimate of the aspect ratio distribution. The frequency ("linear density") of high aspect ratio grains (i.e., grains having an aspect ratio greater than 4) was found to correlate with toughness. This correlation is presented in FIG. 6.

The compressive creep of Example No. Q was examined on a cylinder (0.263 inch diameter, 0.5 inch length) loaded between two silicon carbide rods at 1371 degrees C. and 200 MPa. Four silicon nitride flags were cantilevered on the cylinders. The distance between the flags was measured by a non-contact laser extensometer system. The compressive creep of Example No. Q was observed to be $10^{-6}$ /sec. Because this level of creep resistance is similar to that found in conventional silicon nitride ceramics using only a single rare earth sintering aid (e.g., NT-154, manufactured by the Norton Company, Worcester, Mass.), utilizing a binary rare earth system in a hipped silicon nitride ceramic likely increases its toughness without degrading its high temperature properties.

It has also been observed that certain binary rare earth systems form two distinct phases within the grain boundary region of a sintered silicon nitride ceramic, i.e., a first phase consisting essentially of a first rare earth disilicate and the second phase consisting essentially of a second rare earth disilicate. Conventional rare earth systems tend towards a single disilicate phase in the grain boundaries of a sintered silicon nitride ceramic. For example, it is well known that a single rare earth oxide tends towards a single disilicate phase in the grain boundary regions. Similarly, a pair of rare earths having similar atomic radii likely form a solid solution at equilibrium and so tends towards a single disilicate phase also. Lastly, a pair of rare earths having dissimilar atomic radii but utilized in amounts which, at equilibrium, fall outside the two phase region also tends towards a single disilicate phase in the grain boundary regions. Because there are no other phases in the grain boundary to compete with, these predominant disilicate phases tend to form large (i.e., about 1 mm) disilicate crystals. When these crystals become this large, they can act as severe toughness and strength limiting flaws. In contrast, when rare earths are selected from different lanthanide groups (and so have dissimilar atomic radii) and are utilized in amounts which fall within the two phase disilicate region at equilibrium, two competing disilicate phases are produced with neither disilicate phase being able to form large crystals which limit strength, i.e, the presence of a second disilicate phase prevents either disilicate phase from growing too large and acting like a strength limiting flaw. In these embodiments, the rare earth oxides having dissimilar radii are selected from two of the three lanthanide subgroups, such subgroups comprising:

a) lanthanum, cerium, praesodynmium, neodymium, promethium, samarium and europium;

b) gadolinium, terbium, dysprosium and holmium; and c) yttrium, erbium, thulium, ytterbium, and lutetium, wherein the amounts of each rare earth oxide are selected so that the silicon nitride/binary rare earth mixture forms two rare earth disilicate phases at equilibrium. When a binary rare earth sintering aid system is used in accordance with the present invention, these crystalline phases are not visible at 200X. Although this dual phase phenomenon has only been examined in embodiments having a standard hipping cycle (i.e., no presinter nor post-HIP heat treatment), it is believed that the dual phase could also exist in embodiments containing either the presinter or post-HIP heat treatments.

It has also been observed that when the binary rare earth system is selected from different lanthanide groups (and so have dissimilar atomic radii) and are utilized in amounts which fall within the two phase disilicate region at equilibrium, rapid cooling of the hipped ceramic can lead to an amorphous grain boundary phase. Without wishing to be tied to a theory, it is believed that the formation of two rare earth disilicate phases in the grain boundary phase requires much more ordering and therefore much more energy and time than a single rare earth disilicate phase. When insufficient cooling time is given to such binary rare earth systems, an amorphous phase is formed. Because the amorphous grain boundary phase provides low residual stress, the ceramics produced in these embodiments are thought to be useful in high stress applications such as bearing applications which require a very uniform microstructure.

EXAMPLES U–X

The ability of binary rare earth systems to form both amorphous and crystallite phases is presented in Examples U–X. Ube E03, E05 and E10 silicon nitride powder was used as the silicon nitride starting material. This silicon nitride starting material was mixed with rare earth oxides so that the total rare earth oxide content was 0.0177 moles per 100 grams of powder. The rare earths used in these Examples were as follows:

| Example | Rare Earth #1 (w/o) | | Rare Earth #2(w/o) | |
|---|---|---|---|---|
| U | ytterbia | 4.09 | lanthia | 2.25 |
| V | ytterbia | 4.85 | lanthia | 1.61 |
| W | yttria | 2.58 | lanthia | 2.01 |
| X | yttria | 1.60 | lanthia | 3.40 |

These Examples were selected to provide dual rare earth disilicate phases at equilibrium. In addition, two single rare earth systems, Comparative Examples CC and CD, were processed identically to Examples U–X, in order to study the effect of the binary systems on crystallite size. Their compositions were as follows:

| Example | Rare Earth #1 (w/o) | |
|---|---|---|
| CC | ytterbia | 6.78 |
| CD | lanthia | 5.67 |

Each of these mixtures was ball milled for 36 hours in isopropanol at a concentration of 45–50 w/o solids to form a milled slurry having a final surface area of about 8–11 $m^2/g$ and a mean particle size of about 0.6 microns. This milled slurry was then wet screened through a 400 mesh screen. Next, the isopropanol was evaporated in a friction air dryer, yielding a dry powder. The powder was then pressed into a three inch square tile to facilitate handling. The tiles were then sequentially subjected to cold isostatic pressing at 30,000 psi; presintered at 1450 degrees C.; hipped at a temperature about 1840 degrees C. at 25 to 30 ksi for 60 minutes to form ceramic bodies; and then rapidly cooled at a rate of between about 700 and about 1000 degrees C. per hour until the ceramic reached a temperature of about 600 degrees C.

It was observed that none of the hipped Examples U–X possessed a crystallized grain boundary phase (i.e., each had an amorphous grain boundary phase). In contrast, XRD analysis of Comparative Examples CC and CD revealed that each possessed a crystallized grain boundary with crystals on the order of 1 mm in diameter.

After determining that each of Examples U–X possessed an amorphous grain boundary phase, each was subjected to a post-hip heat treatment in nitrogen at about 1400 degrees C. for about 10 hours. XRD analysis of these heat-treated Examples revealed that the grain boundaries had crystallized into unquantifiably small sized crystals. Further meaningful analysis of the size and type of the grain boundary phases of Examples U–X could not be undertaken. Because crystal size was unquantifiable via XRD analysis of Examples U–X, it can be reasonably concluded that these Examples contained much smaller crystals and that the small size can be attributed to the competition between the dual disilicate phases.

When HIPping is used for densification, the ceramics of the present invention may be made into shapes sufficiently complicated such that the shape can not be produced by hot pressing.

I claim:

1. A sintered silicon nitride ceramic comprising:
   a) a crystalline phase comprising between about 85 w/o and about 95 w/o beta silicon nitride grains, and
   b) a grain boundary phase consisting essentially of
      i) between about 0.6 mol % and about 3.2 mol % rare earth, as rare earth oxide, and
      ii) no more than 2.0 w/o excess oxygen, as silica,
   wherein at least about 20% of the beta silicon nitride grains have a thickness of greater than 1 micron.

2. The ceramic of claim 1 having a density of at least about 99.5% of theoretical density.

3. The ceramic of claim 2 having an initial toughness of at least 8 MPa $m^{1/2}$.

4. The ceramic of claim 3 wherein the toughness increases to at least 9.0 MPa $m^{1/2}$ at a crack length of 600 microns.

5. The ceramic of claim 4 wherein the rare earth component comprises neodymium and ytterbium.

6. The ceramic of claim 4 wherein the rare earth component comprises about 3 w/o neodymium and about 3.5 w/o ytterbium, as rare earth oxides.

7. The ceramic of claim 1, wherein at least about 50% of the beta silicon nitride grains have a thickness of greater than 1 micron.

8. The ceramic of claim 7 wherein at least about 45% of the beta silicon nitride grains have an aspect ratio of at least 6.

9. The ceramic of claim 8 having an initial toughness of at least 9 MPa $m^{1/2}$.

10. The ceramic of claim 9 wherein the toughness increases to at least 11.0 MPa $m^{1/2}$ at a crack length of 600 microns.

11. The ceramic of claim 10 wherein the rare earth component comprises samaria and erbia.

12. A sintered silicon nitride ceramic comprising:
   a) a crystalline phase comprising between about 85 w/o and about 95 w/o beta silicon nitride grains, and
   b) a grain boundary phase consisting essentially of
      i) between about 0.6 mol % and about 3.2 mol % rare earth, as rare earth oxide, and
      ii) between about 1.5 and about 4.0 w/o excess oxygen, as silica,
   wherein the ceramic has an initial fracture toughness of at least about 8 MPa $m^{1/2}$.

13. The ceramic of claim 12 wherein at least about 20% of the beta silicon nitride grains have a thickness of greater than 1 micron.

14. The ceramic of claim 13 wherein at least about 45% of the beta silicon nitride grains have an aspect ratio of at least 6.

15. The ceramic of claim 14 wherein at least about 50% of the beta silicon nitride grains have a thickness of greater than 1 micron.

16. The ceramic of claim 15 having an initial fracture toughness of at least 9 MPa $m^{1/2}$.

17. The ceramic of claim 16 wherein the toughness increases to at least 11.0 MPa $m^{1/2}$ at a crack length of 600 microns.

18. The ceramic of claim 17 wherein the rare earth component comprises samaria and erbia.

* * * * *